UNITED STATES PATENT OFFICE.

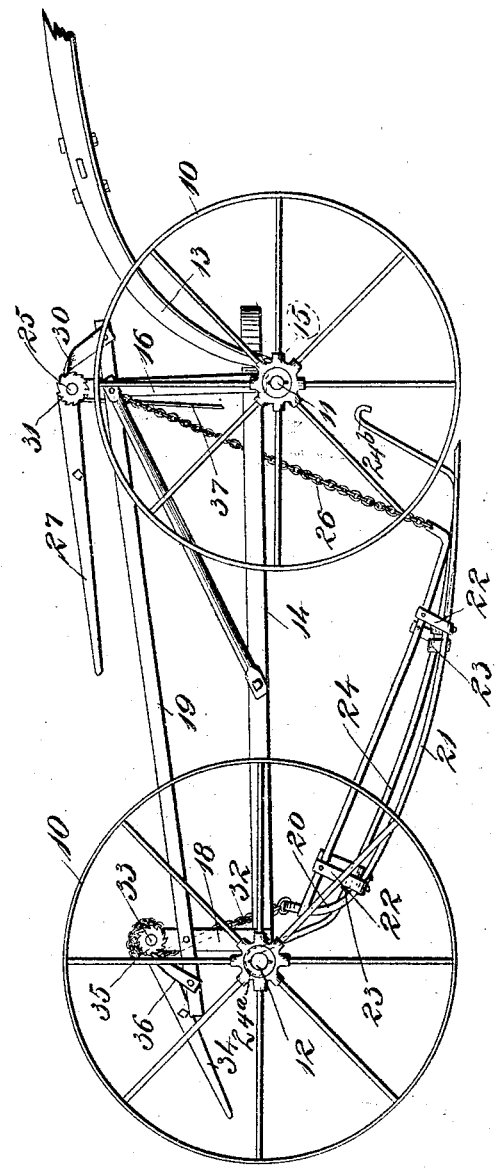

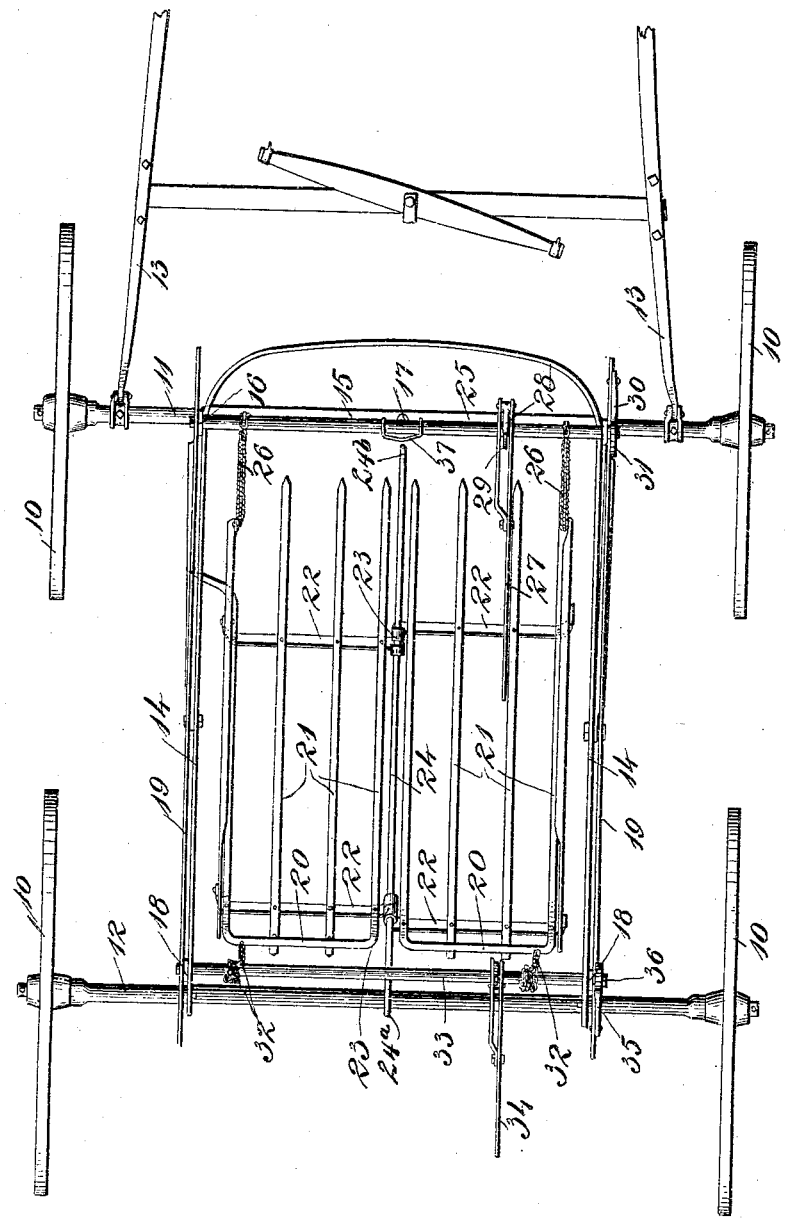

JOHN M. RORABAW, OF DIAMOND, MISSOURI.

STONE-GATHERER.

940,558. Specification of Letters Patent. Patented Nov. 16, 1909.

Application filed June 13, 1908, Serial No. 438,268. Renewed May 15, 1909. Serial No. 496,308.

*To all whom it may concern:*

Be it known that I, JOHN M. RORABAW, a citizen of the United States, residing at Diamond, in the county of Newton and State of Missouri, have invented certain new and useful Improvements in Stone-Gatherers, of which the following is a specification.

This invention is a machine for gathering stones, characterized by a wheeled-frame carrying a rake-like gathering device which runs on the ground and picks up loose stones in its path.

The object of the invention is to provide a machine of this kind which is simple in construction, and efficient in operation.

A further object of the invention is to provide a gathering device which can be used for cutting roots, and also for pulling stumps.

Another object of the invention is to provide a construction whereby the gathering device can be easily dumped to discharge its load.

In the accompanying drawing, Figure 1 is a side elevation of the machine with the gathering device in operative position. Fig. 2 is a plan view.

Referring specifically to the drawings, 10 denotes the wheels on which the machine travels. A front axle 11, and a rear axle 12 are provided. To the front axle are connected shafts 13 for attachment of a draft animal.

The axles support longitudinal bars 14 which are connected at their front ends so as to form a U-shaped frame. Adjacent the front axle, the bars are connected by a cross-bar 15 which is bent upwardly at its ends to form standards 16 for a purpose to be hereinafter described. The front axle is connected to the cross-bar 15 by a king-bolt 17 so that said axle may turn to steer the machine. The bars 14 are connected to the rear axle in any suitable manner, and adjacent said axle standards 18 are secured to the bars. The standards 16 and 18 are connected by braces 19.

The gathering device comprises a rake-like structure which is in two sections, each of which comprises a head 20 from which extend tines 21 which are connected and braced by cross-bars 22. The inner ends of these cross-bars are formed into knuckles 23 to receive a hinge-rod 24 whereby a hinge-joint between two sections is had, the axis of said joint extending lengthwise with respect to the machine. At its rear end the hinge-rod is pivotally connected to the rear axle 12 as indicated at 24$^a$, and at its front end it has a hook 24$^b$ which is for a purpose to be hereinafter described.

On the standards 16 is mounted a rotatable shaft 25 to which are fastened chains 26. The shaft is rotated by a lever 27 carrying a pawl 28 which acts on a ratchet 29 on the shaft. Back slip of the shaft is prevented by a pawl 30 pivoted to one of the bars 19 and engageable with a ratchet 31 on the shaft. The chains 26 are spaced from each other and are connected to the front ends of the rake-sections.

To the rear ends of the rake-sections are connected chains 32 which are wound on a rotatable shaft 33 mounted on the standards 18. This shaft also has a pawl 34 for rotating it, and a ratchet 35 and pawl 36 for preventing back slip the same as the shaft 25.

In use, the rake-sections are spread out or opened and their front ends lowered to the ground by unwinding the chains 26, and winding up the chains 32. The machine is then drawn across the field whereupon all loose stones in the path of the rake-sections are gathered up thereby. Upon carrying the load to the place to be dumped, the front ends of the rake-sections are elevated by winding up the chains 26 and the hook 24$^b$ of the hinge-rod 24 is placed in a looped rod 37 carried by the shaft 25. To dump the load, the pawls 30 and 31 are thrown off their respective ratchets which releases the shafts 25 and 33 and permits the chains 26 and 32 to unwind, whereupon the outer ends of the rake-sections drop down and the load is automatically discharged. The chains are connected to the outer ends of the respective rake-sections, and as the hinge-rod 24 is held stationary by the looped rod 37 and the axle 12, the rake-sections tilt sidewise by the weight of the load, when the chains are released as stated.

The machine herein described is strong and durable, simple in construction, it can be easily operated, and it effectually serves the purpose for which it is intended.

The machine can also be used for pulling stumps by running the rake-sections under the stump and then elevating them by winding up the chains; and upon running the rake-sections into the ground roots may be cut, the top edges of the tines being sharpened for this purpose. The field therefore, can be thoroughly cleared of stones, roots, and stumps, and the machine can also be used for sub-soiling.

I claim:

1. A stone-gatherer comprising a supporting-frame, a rake carried thereby comprising hinged sections, and means for tilting the sections sidewise.

2. A stone-gatherer comprising a supporting-frame, a rake pivotally mounted thereon and comprising hinged sections, means for raising and lowering the free end of the rake, and means for tilting the sections sidewise.

3. A stone-gatherer comprising a supporting-frame, a sectional rake carried thereby, a hinge-joint between the rake-sections including a hinge-rod pivotally mounted on the supporting-frame, means for raising and lowering the free end of the rake, means for supporting the free end of the hinge-rod in elevated position, and means for tilting the rake-sections sidewise.

4. A stone-gatherer comprising a supporting-frame, hoisting devices mounted thereon, a sectional rake pivotally mounted on the supporting-frame and connected at its ends from said hoisting devices, and a hinge connection between the rake-sections.

5. A stone-gatherer comprising a supporting-frame, rotatable shafts mounted on said frame, chains wound on the shafts, a sectional rake pivotally mounted on the supporting-frame and connected at its ends to the chains, and a hinge connection between the rake-sections.

6. A stone-gatherer comprising a supporting-frame, a sectional rake, each section comprising a head, tines, and cross-bars connecting the tines, the inner ends of the cross-bars having hinge-knuckles, a hinge-rod passing through the knuckles, and pivotally connected at one end to the supporting-frame, and means for tilting the rake-sections sidewise.

In testimony whereof I affix my signature, in presence of two witnesses.

JOHN M. RORABAW.

Witnesses:
  A. P. SHOWAN,
  J. H. ROBINSON.